(12) United States Patent
Lee et al.

(10) Patent No.: US 11,784,352 B2
(45) Date of Patent: Oct. 10, 2023

(54) ELECTRODE ASSEMBLY AND METHOD FOR MANUFACTURING THE SAME

(71) Applicant: LG Chem, Ltd., Seoul (KR)

(72) Inventors: Yong Jun Lee, Daejeon (KR); Tae Ho Hwang, Daejeon (KR); Chan Ho Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 232 days.

(21) Appl. No.: 16/349,426

(22) PCT Filed: Jun. 19, 2018

(86) PCT No.: PCT/KR2018/006872
§ 371 (c)(1),
(2) Date: May 13, 2019

(87) PCT Pub. No.: WO2019/093610
PCT Pub. Date: May 16, 2019

(65) Prior Publication Data
US 2020/0235434 A1    Jul. 23, 2020

(30) Foreign Application Priority Data
Nov. 13, 2017 (KR) .......................... 10-2017-0150821

(51) Int. Cl.
*H01M 10/0585* (2010.01)
*H01M 4/139* (2010.01)
(Continued)

(52) U.S. Cl.
CPC ....... *H01M 10/0585* (2013.01); *H01M 4/139* (2013.01); *H01M 10/052* (2013.01);
(Continued)

(58) Field of Classification Search
CPC ............ H01M 4/139; H01M 10/0585; H01M 10/052; H01M 10/04; H01M 10/0583;
(Continued)

(56) References Cited

U.S. PATENT DOCUMENTS

2006/0240317 A1    10/2006  Phillips et al.
2006/0275661 A1    12/2006  Kim et al.
(Continued)

FOREIGN PATENT DOCUMENTS

CN        102468464 A     5/2012
CN        103943878 A     7/2014
(Continued)

OTHER PUBLICATIONS

English Translation of KR20140042328.*
(Continued)

*Primary Examiner* — Kiran Quraishi Akhtar
(74) *Attorney, Agent, or Firm* — Birch, Stewart, Kolasch & Birch, LLP (57) ABSTRACT

A method for manufacturing an electrode assembly, in which a plurality of electrodes are stacked, wherein a negative electrode and a positive electrode are sequentially and alternately stacked, and a separator is disposed therebetween is provided. The method includes covering a top surface of an electrode disposed at an n layer (n being a natural number) with the separator, heating the separator covering the electrode disposed at the n layer, stacking an electrode disposed at an n+1 layer on the heated separator, covering a top surface of the electrode disposed at the n+1 layer with the separator, and heating the separator covering the electrode disposed at the n+1 layer. The separator is bonded to the electrode, or the separators are bonded to each other to fix the movement of the electrode, thereby improving sta-
(Continued)

bility. Since the separator is not stacked in the width direction, capacity per volume increases.

12 Claims, 12 Drawing Sheets

(51) Int. Cl.
*H01M 10/052* (2010.01)
*H01M 50/46* (2021.01)
*H01M 50/403* (2021.01)
*H01M 50/552* (2021.01)
*H01M 50/466* (2021.01)

(52) U.S. Cl.
CPC ......... *H01M 50/403* (2021.01); *H01M 50/46* (2021.01); *H01M 50/466* (2021.01); *H01M 50/552* (2021.01)

(58) Field of Classification Search
CPC ............. H01M 10/0459; H01M 50/46; H01M 50/403; H01M 50/463; H01M 50/543; H01M 50/409; Y02E 60/10
See application file for complete search history.

(56) References Cited

U.S. PATENT DOCUMENTS

| | | | |
|---|---|---|---|
| 2007/0218355 A1 | 9/2007 | Ryu et al. | |
| 2009/0165936 A1* | 7/2009 | Sakata | H01M 10/0409 |
| | | | 156/227 |
| 2009/0233159 A1 | 9/2009 | Phillips et al. | |
| 2011/0059343 A1 | 3/2011 | McKinney et al. | |
| 2011/0244304 A1 | 10/2011 | Shinyashiki et al. | |
| 2012/0177975 A1* | 7/2012 | Yageta | H01M 10/0583 |
| | | | 429/144 |
| 2012/0189894 A1* | 7/2012 | Ahn | H01M 10/0459 |
| | | | 429/135 |
| 2012/0208066 A1* | 8/2012 | Schaefer | H01M 10/0583 |
| | | | 429/131 |
| 2012/0279056 A1 | 11/2012 | McKinney et al. | |
| 2013/0266841 A1 | 10/2013 | Ryu et al. | |
| 2014/0030567 A1 | 1/2014 | McKinney et al. | |
| 2014/0205886 A1 | 7/2014 | Sakaguchi | |
| 2014/0349192 A1* | 11/2014 | Park | H01M 50/431 |
| | | | 429/246 |
| 2015/0180082 A1* | 6/2015 | Jung | H01M 10/0583 |
| | | | 429/246 |
| 2015/0236337 A1* | 8/2015 | Kim | H01M 10/0436 |
| | | | 429/139 |
| 2015/0263375 A1* | 9/2015 | Redmann | H01M 10/0583 |
| | | | 29/623.1 |
| 2015/0333361 A1* | 11/2015 | Sato | H01M 10/0459 |
| | | | 29/623.1 |
| 2016/0313769 A1* | 10/2016 | Yoshitani | G06F 3/0446 |

FOREIGN PATENT DOCUMENTS

| | | | | |
|---|---|---|---|---|
| CN | 104170151 A | 11/2014 | | |
| CN | 104737349 A | 6/2015 | | |
| CN | 106066549 A | 11/2016 | | |
| JP | 2009-218105 A | 9/2009 | | |
| JP | 2011-210524 A | 10/2011 | | |
| JP | 2012-74402 A | 4/2012 | | |
| JP | 2015-532513 A | 11/2015 | | |
| KR | 10-2006-0119797 A | 11/2006 | | |
| KR | 10-2007-0093642 A | 9/2007 | | |
| KR | 10-2009-0008085 A | 1/2009 | | |
| KR | 20090008085 | * | 1/2009 | ......... H01M 10/052 |
| KR | 10-2012-0052041 A | 5/2012 | | |
| KR | 10-2012-0055656 A | 5/2012 | | |
| KR | 10-2014-0042328 A | 4/2014 | | |
| KR | 20140042328 | * | 4/2014 | ............ Y02E 60/10 |
| KR | 10-1664945 B1 | 10/2016 | | |
| KR | 10-2016-0139192 A | 12/2016 | | |
| KR | 10-2017-0122030 A | 11/2017 | | |

OTHER PUBLICATIONS

English Translation of KR20090008085.*
European Searh Report issued in European Patent Application No. 18 87 5790, dated Jan. 23, 2020.

* cited by examiner

ELECTRODE ASSEMBLY AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/006872, filed Jun. 19, 2018, designating the United States, which claims priority to Korean Application No. 10-2017-0150821, filed Nov. 13, 2017. The entire contents of the aforementioned patent applications are incorporated herein by this reference.

TECHNICAL FIELD

The present invention relates to an electrode assembly (e.g., a stack-type battery in which a plurality of electrode plates are stacked), which is built in a secondary battery and a method for manufacturing the electrode assembly, and more particularly, to a method for manufacturing an electrode assembly, which is capable of increasing a capacity per volume more than that of a conventional structure, fixing movement of an electrode (e.g., an electrode plate, a negative electrode and a positive electrode), and preventing a separator from shrinking, and an electrode assembly manufactured through the above-described manufacturing method.

BACKGROUND ART

The demand for secondary batteries as energy sources is rapidly increasing in various fields such as personal portable devices and electric vehicles.

Unlike primary batteries, rechargeable secondary batteries are being developed not only for digital devices but also for vehicles such as electric vehicles.

Secondary batteries are classified based on materials and external shapes of a positive electrode and a negative electrode. Among them, since a lithium secondary battery using a lithium compound material has a large capacity and a low self-discharge rate, the lithium secondary battery is widely used as power sources of various electrical devices over a nickel-cadmium secondary battery according to the related art.

In addition, the lithium secondary battery may be manufactured in various shapes. Representatively, the lithium secondary battery may be classified into a cylinder type secondary battery, a prismatic type secondary battery, and a pouch type secondary battery. Typically, an electrode assembly for charging and discharging electric energy is built in a case.

The electrode assembly may be generally manufactured through a lamination winding method in which a negative electrode, a positive electrode, and a separator are laminated (thermally bonded) to allow the positive electrode and the negative electrode to be disposed on a separator and then are wound (rolled) and a stacking method in which a negative electrode, a positive electrode, and a separator are sequentially stacked.

In the lamination winding method, the negative electrode, the positive electrode, and the separator are wound with the negative electrode and the positive electrode bonded to the separator to improve stability without movement of the negative electrode and the positive electrode. On the other hand, when the winding (rolling) is performed, the separator may be stacked in a width direction of the electrode assembly to increase the volume in the width direction. As a result, capacity per volume may decrease.

In the stacking method, as illustrated in FIGS. 1A to 1D, a negative electrode 2 and a positive electrode 3 respectively move from both sides to a center with a separator 1 therebetween and then stacked. The separator 1 is stacked between the negative electrode 2 and the positive electrode 3 in a zigzag shape during the stacking.

Figure 1A:
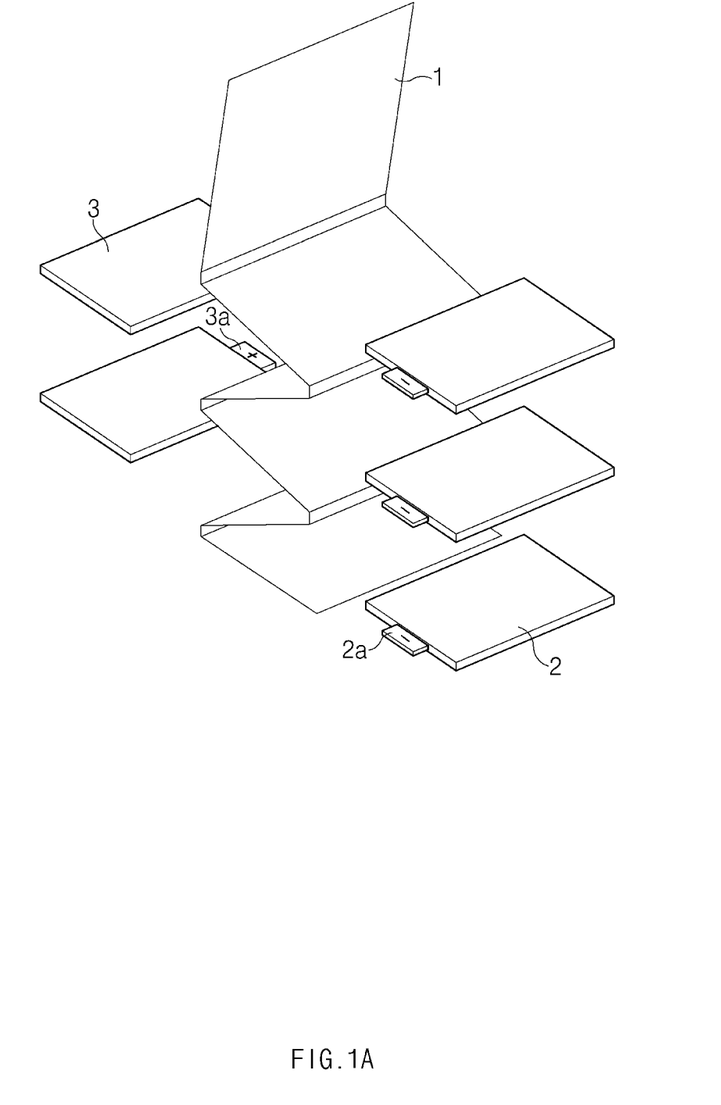
FIG. 1A is an exploded perspective view of an electrode assembly manufactured by a stacking method according to a related art.
Figure 1B:
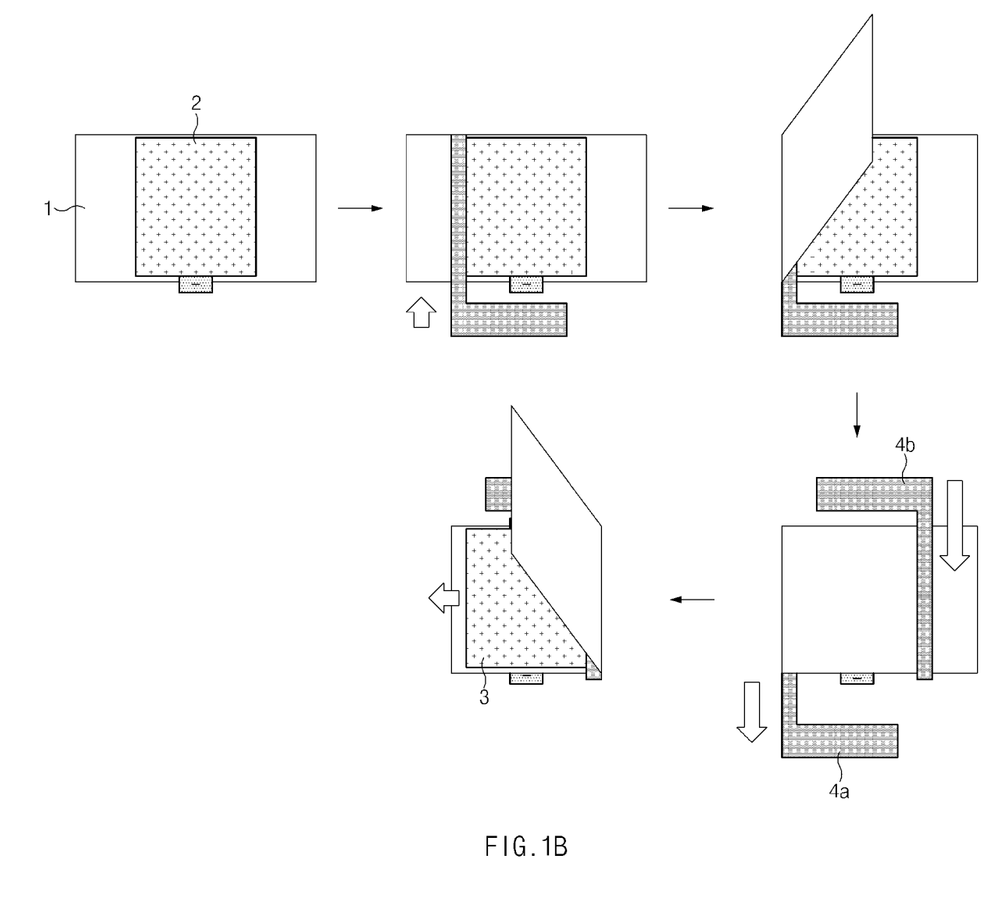
FIG. 1B is a plan view illustrating processes of manufacturing the electrode assembly by the stacking method according to the related art.
Figure 1C:
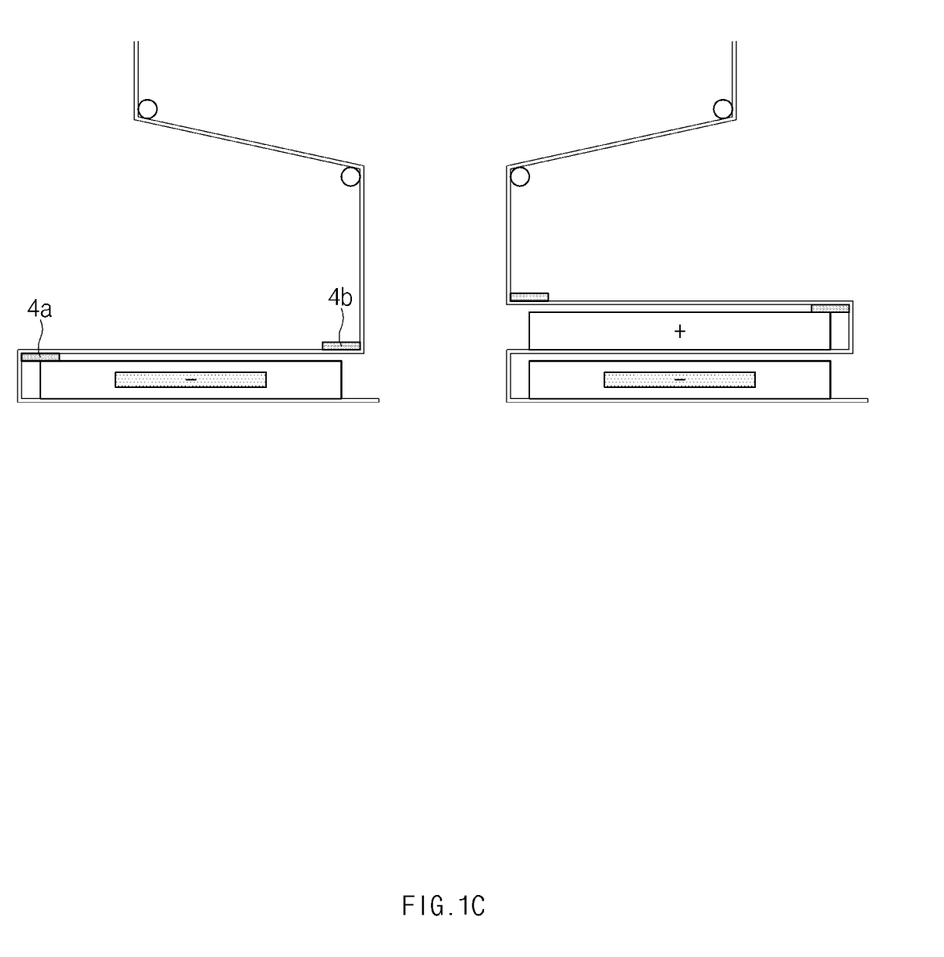
FIG. 1C is a front view illustrating the processes of manufacturing the electrode assembly by the stacking method according to the related art.
Figure 1D:
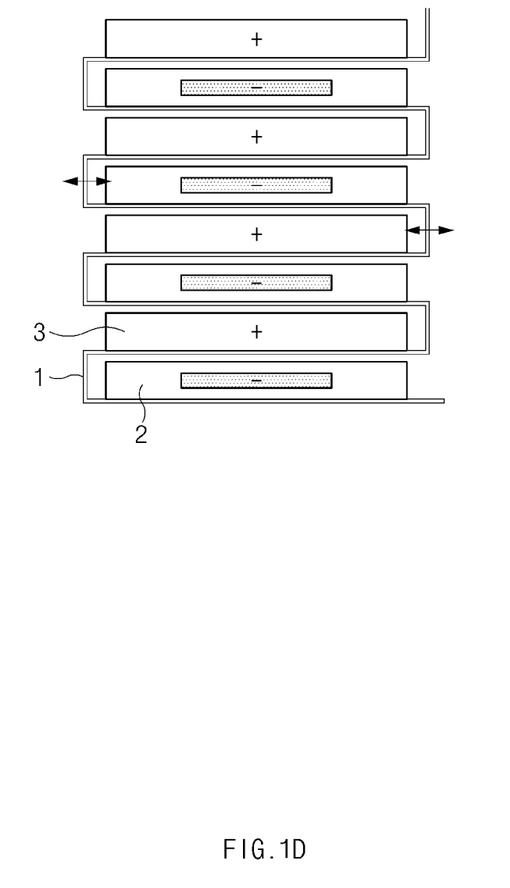
FIG. 1D is a front view of the electrode assembly manufactured by the stacking method according to the related art.

In other words, as illustrated in FIG. 1B, when the negative electrode 2 is stacked on the separator 1 with the separator 1 disposed at the lowermost side, a gripper 4a enters into one side to fix a portion of the separator 1, and subsequently, the separator 1 is folded with respect to the gripper 4a, and the positive electrode 3 is stacked on the folded separator. In addition, when the gripper 4b enters into the other side to fix a portion of the separator 1, the separator is folded to an opposite side, and the electrode (the negative electrode and the positive electrode) are stacked, and also, the above-described processes are repeatedly performed (for reference, although a negative electrode tab 2a and a positive electrode tab 3a are disposed in the opposite direction in the drawings, this structure may vary depending on a design of the secondary battery).

As described above, the stacking method is advantageous in that the capacity per unit volume increases compared with the lamination winding method. However, since the negative electrode 2 and the positive electrode 3 are not fixed, the electrode moves in the width direction (a direction indicated by an arrow in FIG. 1D) to deteriorate the stability.

DISCLOSURE OF THE INVENTION

Technical Problem

A main object of the present invention is to provide a method for manufacturing an electrode assembly, in which movement of an electrode is suppressed to improve stability by combining advantages of a lamination method and a stacking method, and capacity per unit volume increases, and an electrode assembly manufactured by the above-described manufacturing method.

Technical Solution

To achieve the above-described object, a method for manufacturing an electrode assembly, in which a plurality of electrodes are stacked, wherein a negative electrode and a positive electrode are sequentially and alternately stacked, and a separator is disposed between the negative electrode and the positive electrode, according to the present invention comprises a step of covering a top surface of an electrode disposed at an n layer (where n is a natural number greater than or equal to 1) with the separator; a step of heating the separator that covers the electrode disposed at the n layer; a step of stacking an electrode, which is disposed at an n+1 layer, on the heated separator; a step of covering a top surface of the electrode, which is disposed at the n+1 layer, with the separator; and a step of heating the separator that covers the electrode disposed at the n+1 layer.

The separator may cover the electrode being connected from an end of one side to an end of the other side of the electrode disposed at the n layer, and while the electrode disposed at the n layer and the electrode disposed at the n+1 layer are continually stacked, the separator may have a continuous shape that plies in a zigzag shape between the one side and the other side of the electrodes.

When the separator plies between the one side and the other side to be continuous in the zigzag shape, a gripper that supports a point, at which the separator is bent while the separator is changed in direction, may be inserted.

The gripper may be slidably disposed in a direction perpendicular to the direction in which the separator plies, and the gripper may be provided in two, which are disposed one by one at positions that face each other.

In an embodiment of the present invention, the separator may be heated by a heating plate, and heat and pressure may be applied to the separator to bond the separator to the top surface of the electrode contacting the separator.

In another embodiment of the present invention, the separator may be heated by the gripper, and heat and pressure may be applied to the separator to bond the separator disposed at the corresponding layer to the separator disposed below the separator disposed at the corresponding layer.

The gripper may have a size and a shape that are capable of pressing an edge of the separator, on which the electrode is not covered. In particular, the electrode may have a rectangular plate shape, and the gripper may have a shape having at least one orthogonal portion (e.g., an 'L' shape).

Furthermore, the present invention provides an electrode manufactured according to the above-described method.

The former electrode assembly may be an electrode assembly, in which a plurality of electrodes are stacked, wherein a negative electrode and a positive electrode are sequentially and alternately stacked, and a separator is disposed between the negative electrode and the positive electrode, wherein a top surface of an electrode disposed at an n layer (where n is a natural number greater than or equal to 1), and the separator is fixed and bonded to the top surface of the electrode.

The electrode assembly may be an electrode assembly, in which a plurality of electrodes are stacked, wherein a negative electrode and a positive electrode are sequentially and alternately stacked, and a separator is disposed between the negative electrode and the positive electrode, wherein a separator disposed at an m layer (where m is a natural number greater than or equal to 1) covers a top surface of an electrode disposed at an n layer (where n is a natural number greater than or equal to 1), an electrode disposed at an n+1 layer is stacked on the separator, and a separator disposed at an m+1 layer covers a top surface of the electrode disposed at the n+1 layer, wherein an edge of the separator disposed at the m+1 layer, on which the electrode is not covered, is gathered and bonded to an edge of the separator disposed at the m layer, on which the electrode is not covered.

Further, the present invention may additionally provide a stack-type battery in which movement of an electrode is prevented, and electrode tabs (negative electrode tabs or positive electrode tabs) are stacked in a direction in which the electrode tabs pass through a separator, and a method for manufacturing the same.

A stack-type battery, in which a plurality of electrodes are stacked, wherein a negative electrode and a positive electrode are sequentially and alternately stacked, and a separator is disposed between the negative electrode and the positive electrode, comprises a first battery element comprising a first electrode plate, a first electrode terminal disposed on at least one end of the first electrode plate, and a separator that covers both surfaces of the electrode plate, wherein the separator is bent from the end of the first electrode plate by a collision, an opening is formed in at least a portion of the collision part, the first electrode terminal is protruded from the separator through the opening therebetween, the separator comprises a second collision part bent from an end of the second electrode plate to cover both surfaces of the second electrode plate disposed on the first battery element and a third collision part disposed in a direction in which the second electrode terminal disposed on the other end of the second electrode plate is protruded, the first electrode terminal and the second electrode terminal are protruded in the same direction, the collision part and the second collision part are bent parts of the separator, the third collision part is a bonding part at which the separators are bonded to each other, and a top surface of an electrode plate disposed at an n layer (where n is a natural number greater than or equal to 1) is covered by the separator, and the separator is fixed and bonded to the top surface of the electrode plate.

In addition, a stack-type battery, in which a plurality of electrodes are stacked, wherein a negative electrode and a positive electrode are sequentially and alternately stacked, and a separator is disposed between the negative electrode and the positive electrode, according to another embodiment comprises a first battery element comprising a first electrode plate, a first electrode terminal disposed on at least one end of the first electrode plate, and a separator that covers both surfaces of the electrode plate, wherein the separator is bent from the end of the first electrode plate by a collision, an opening is formed in at least a portion of the collision part, the first electrode terminal is protruded from the separator through the opening therebetween, the separator comprises a second collision part bent from an end of the second electrode plate to cover both surfaces of the second electrode plate disposed on the first battery element and a third collision part disposed in a direction in which the second electrode terminal disposed on the other end of the second electrode plate is protruded, the first electrode terminal and the second electrode terminal are protruded in the same direction, the collision part and the second collision part are bent parts of the separator, the third collision part is a bonding part at which the separators are bonded to each other, a separator disposed at an m layer (where m is a natural number greater than or equal to 1) covers a top surface of an electrode plate disposed at an n layer (where n is a natural number greater than or equal to 1), an electrode plate disposed at an n+1 layer is stacked on the separator, and a separator disposed at an m+1 layer covers a top surface of the electrode plate disposed at the n+1 layer, and an edge of the separator disposed at the m+1 layer, on which the electrode is not covered, is gathered and bonded to an edge of the separator disposed at the m layer, on which the electrode is not covered.

A method for manufacturing a stack-type battery comprises a step of accommodating a small-area electrode in a bag-shaped separator; a step of bonding at least a portion of an opening of the bag-shaped separator except a position through which a bonding part of a plate-shaped electrode terminal, to which a collector is bonded, is protruded; a step of alternately stacking the small-area electrodes and large-area electrodes; and a step of heating a terminal bonding part of the small-area electrode or the collector of the electrode to thermally fuse the separator, thereby forming a collision part that restricts movement of a cross-section of the large-area electrode, The method further comprises a step of covering a top surface of a small-area electrode disposed at an n layer (where n is a natural number greater than or equal to 1) with the separator; a step of heating the separator covered on the small-area electrode disposed at the n layer; a step of stacking a large-area electrode disposed at an n+1 layer on the heated separator; a step of covering a top surface of the large-area electrode disposed at the n+1 layer with the separator; and a step of heating the separator that covers the top surface of the large-area electrode disposed at the n+1 layer.

Advantageous Effects

According to the present invention having the above-described structure, the separator may be bonded to the electrode, or the separators may be bonded to each other to fix the movement of the electrode, thereby improving the stability. In addition, since the separator is not stacked in the width direction, the capacity per unit volume may increase.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Terms and words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a method for manufacturing an electrode assembly, which is capable of increasing a capacity per volume more than a capacity per volume of a conventional structure, fixing movement of an electrode (a negative electrode and a positive electrode), and preventing a separator 1 from shrinking. The present invention also relates to an electrode assembly manufactured through the above-described manufacturing method.

The manufacturing method according to the present invention is a method for manufacturing an electrode assembly in which a plurality of electrodes, i.e., a negative electrode 2 and a positive electrode 3 are sequentially stacked with a separator 1 disposed between the negative electrode 2 and the positive electrode 3. When a top surface of the lowermost electrode is covered by the separator 1, the separator 1 is heated before the electrode is stacked on the separator 1 to prevent shaking from occurring between the separator 1 and the electrode.

The method for manufacturing the electrode assembly according to the present invention comprises a step of covering a top surface of an electrode disposed at an n layer (where n is a natural number greater than or equal to 1) with the separator, a step of heating the separator covered on the electrode disposed at the n layer, a step of stacking an electrode, which is disposed at an n+1 layer, on the heated separator, a step of covering a top surface of the electrode, which is disposed at the n+1 layer, with the separator, and a step of heating the separator covered on the electrode disposed at the n+1 layer.

Hereinafter, embodiments according to the present invention will be described with reference to the accompanying drawings.

Embodiment 1

Figure 2:
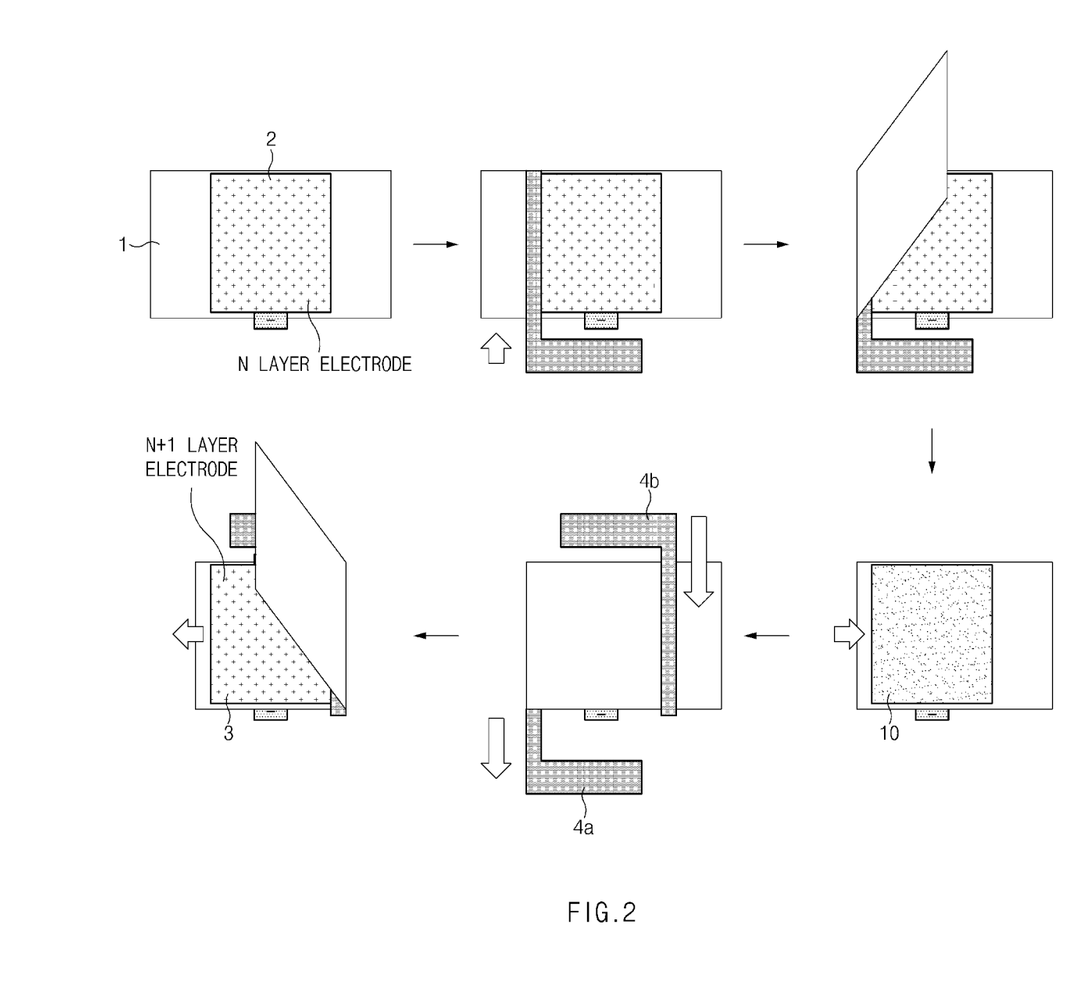
FIG. 2 is a plan view illustrating processes of manufacturing an electrode assembly by a manufacturing method according to a first embodiment of the present invention.
Figure 3:
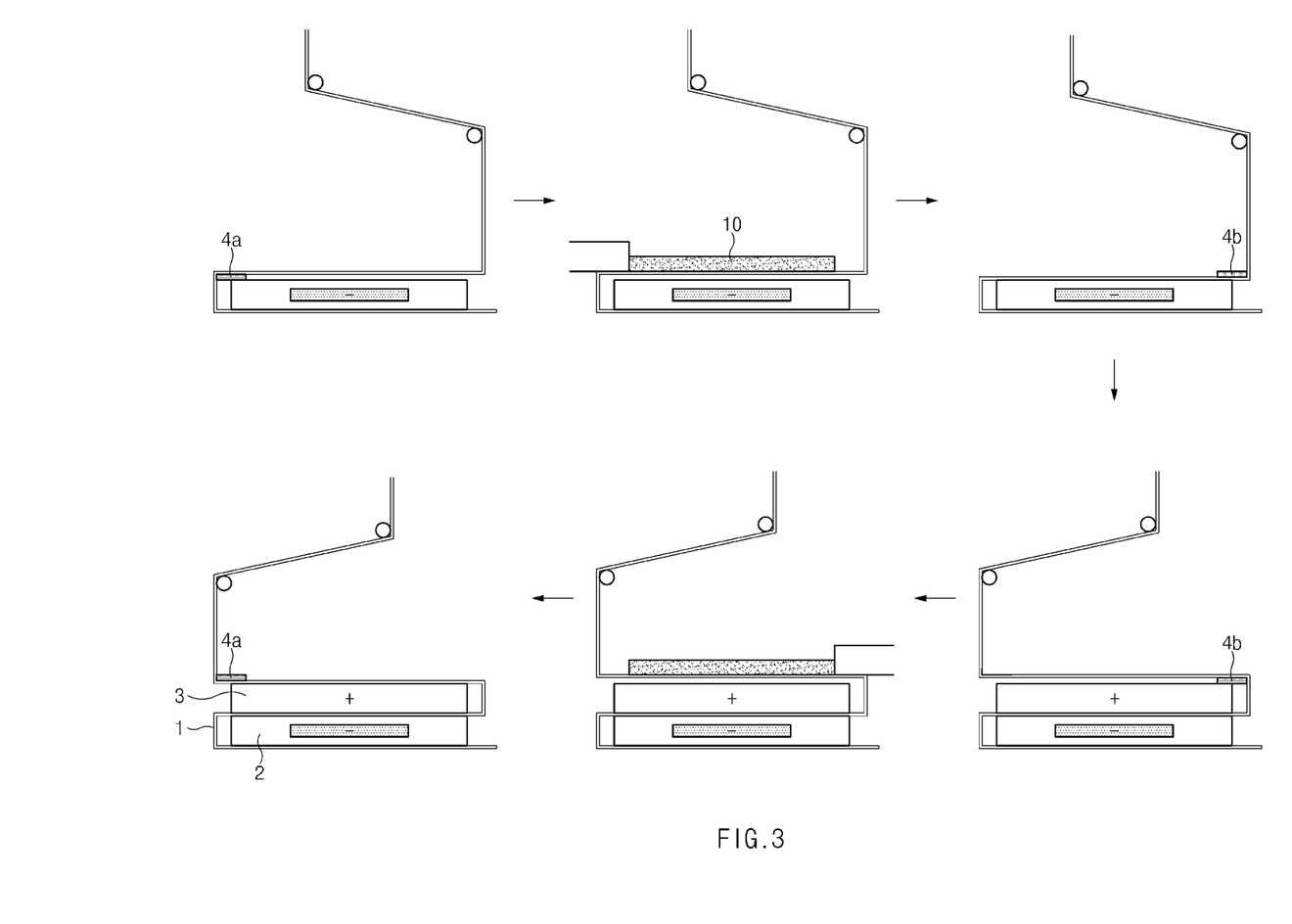
FIG. 3 is a front view illustrating the processes of manufacturing the electrode assembly by the manufacturing method according to the first embodiment of the present invention.

Referring to FIGS. 2 and 3, a separator 1 is disposed to be continuously supplied from an upper side, and a negative electrode 2 and a positive electrode 3 are respectively supplied from one side and the other side with the separator 1 therebetween.

In other words, in a state in which the separator 1 is disposed at the lowermost position, when the negative electrode 2 is disposed on the separator 1, the separator 1 is folded while supported by a gripper 4a to cover a top surface of the negative electrode 2, and a heating plate 10 heats and bonds the separator 1 to the top surface of the negative electrode 2 to bond the top surface of the negative electrode 2 and the separator 1 to each other.

Further, in a state in which the heating plate 10 is returned to its original position, the positive electrode 3 disposed at the other side may be stacked on the heating plate 10, and the gripper 4b disposed at the opposite side enters, and subsequently, the separator 1 is folded again in a direction opposite to the first folded direction. After being folded, the heating plate 10 enters again to bond the top surface of the positive electrode 3 to the separator 1. The above-described processes are continually repeated. The gripper may enter first, or the electrode may be stacked first after the separator 1 is bonded by the heating plate 10.

Thus, the separator 1 has a zigzag shape in which the separator 1 plies between one side and the other side of the electrodes while 'the electrode disposed at the n layer' and 'the electrode disposed at the n+1 layer' are repeatedly stacked.

Furthermore, the grippers 4a and 4b enter to support a point at which the separator 1 is bent while changing direction when the separator 1 has the zigzag shape while plying between the one side and the other side. Two grippers are disposed one by one at positions opposite to each other to be slidable in a direction perpendicular to the direction in which the separator 1 plies.

Figure 4:
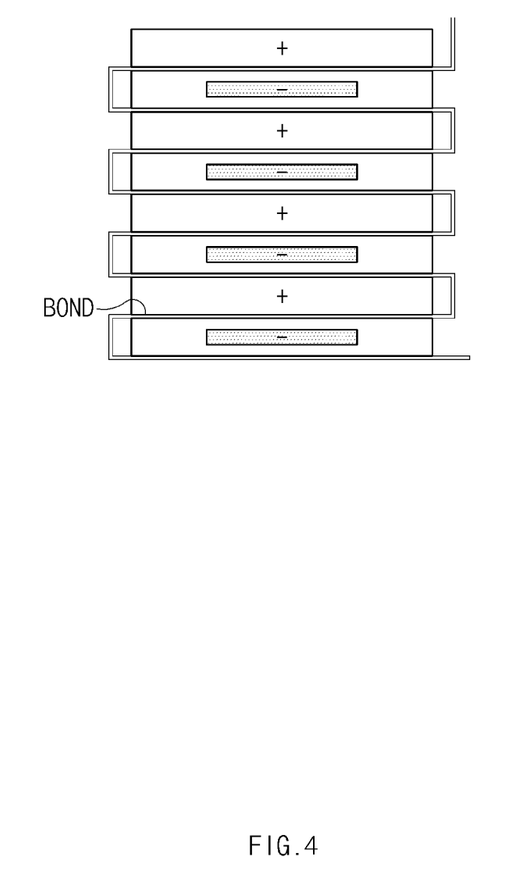
FIG. 4 is a front view of the electrode assembly manufactured by the manufacturing method according to the first embodiment of the present invention

In the electrode assembly manufactured according to the above-described method, the top surface of the electrode disposed at the n layer may be covered by the separator 1 and also fixedly bonded to the separator 1 (the separator and the electrode are directly surface-bonded to each other by the separate heating plate as illustrated in FIG. 4). Thus, the stacking of the electrode may be more firmly secured.

However, according to the above-described manufacturing method, although the movement of the electrode is more reliably suppressed, a sliding device of the heating plate 10 may increase complexity of the process. In addition, a sliding time of the heating plate 10 may increase, and thus, a production time may increase. Therefore, the present invention provides an additional embodiment for solving this problem.

Embodiment 2

Figure 5:
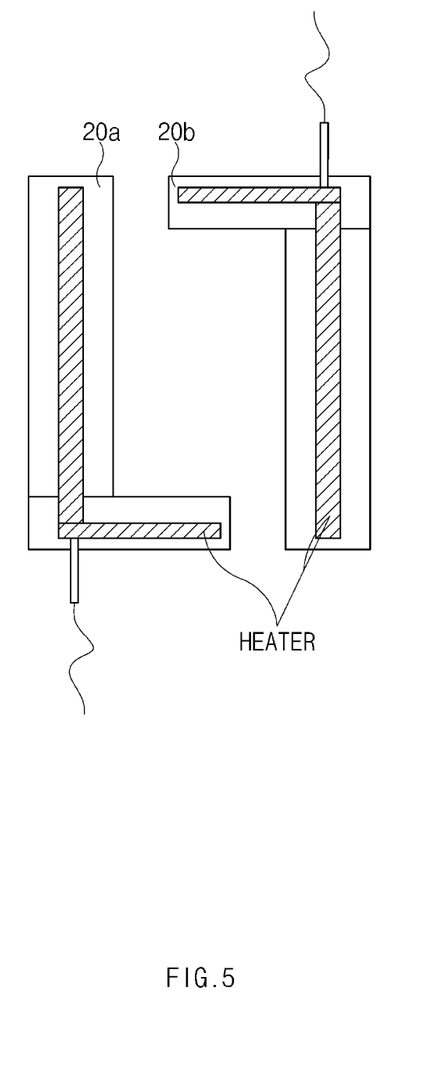
FIG. 5 is a plan view of a gripper used in a manufacturing method according to a second embodiment of the present invention.

In this embodiment, a method for eliminating a separator heating plate 10 will be described. In particular, this embodiment has a feature in which a heater is additionally mounted instead of the heating plate 10, or grippers 20a and 20b for substitutingly performs a function of the heating plate 10 to heat and bond the separator 1.

As illustrated in FIG. 5, in the grippers 20a and 20b used in this embodiment, a heater for applying heat therein may be built to bond the separator disposed at the corresponding layer 1 to the separator disposed below the corresponding layer at a point, at which the separator is folded, at an adequate pressure and temperature.

Thus, the grippers 20a and 20b may have a size and a shape in which an edge of the separator 1, which is not covered by the electrode, is capable of being pressed. In particular, the electrode has a rectangular plate shape, and each of the grippers 20a and 20b has a shape having at least one orthogonal portion (e.g., an 'L' shape).

Figure 6:
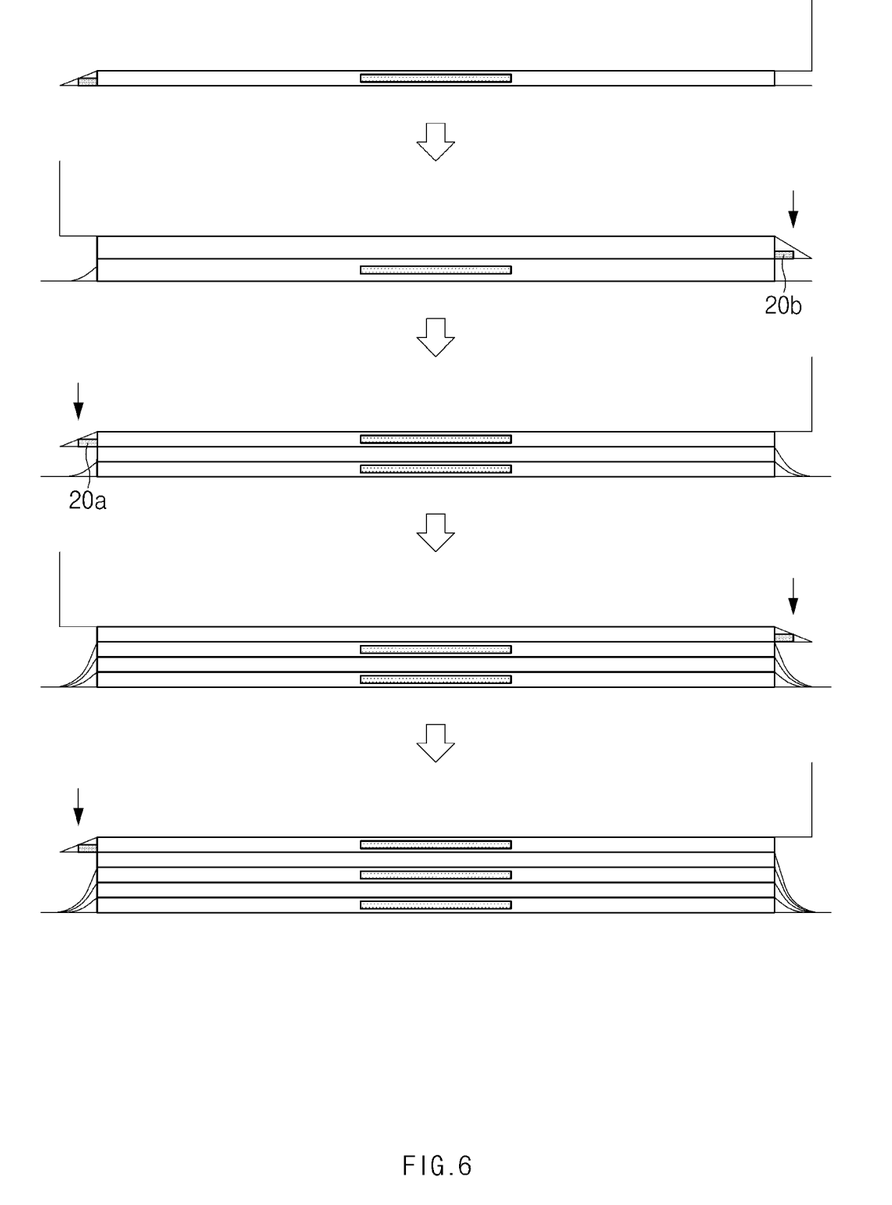
FIG. 6 is a front view illustrating processes of manufacturing an electrode assembly by the manufacturing method according to the second embodiment of the present invention.

As illustrated in FIG. 6, the method according to this embodiment is the same as the method according to Embodiment 1 in that, in a state in which the separator 1 is disposed at the lowermost position, when the negative electrode 2 is disposed on the separator 1, the separator 1 is folded while being supported by the gripper 20a to cover a top surface of the negative electrode 2. The gripper 20a descends downward in a heated state to heat and press an edge of the separator disposed at the lower layer (for reference, the separator is continuously supplied from an upper side to prevent the separator from being sagged or damaged).

Further, the positive electrode 3 disposed at the other side is stacked on the separator 1, and the gripper 20b disposed at the opposite side enters to fold the separator 1 in a direction opposite to the initial folding direction. At the opposite side, the gripper 20b similarly heats and presses the edge of the separator 1 to the edge of the separator 1 disposed at the lower layer. The above-described processes are continually repeated.

Figure 7:
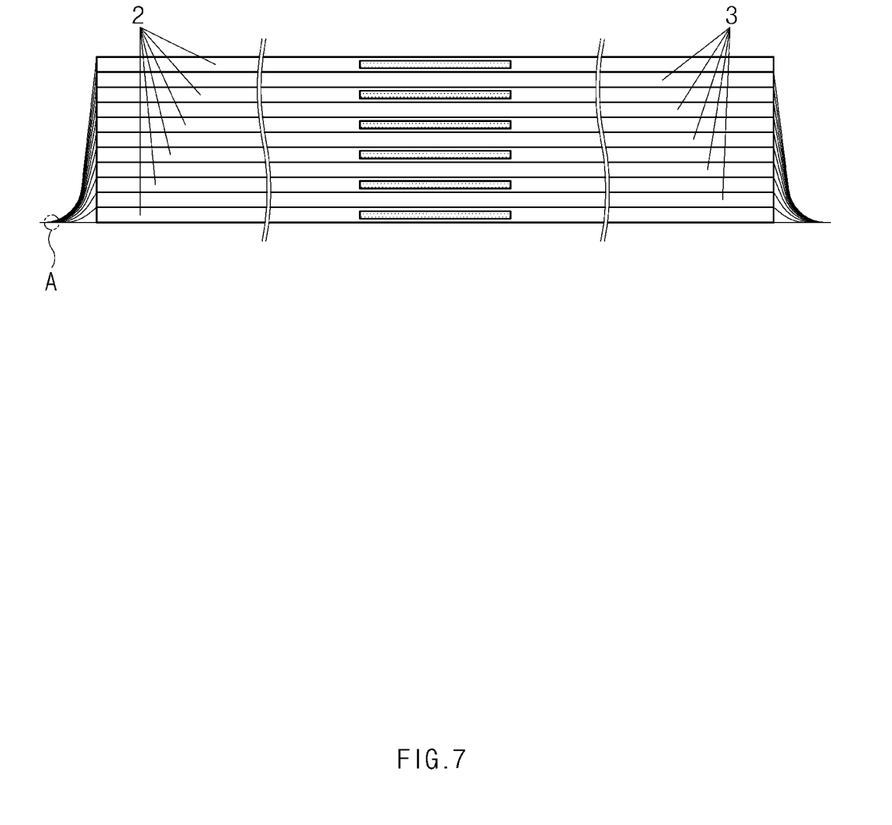
FIG. 7 is a front view of the electrode assembly manufactured by the manufacturing method according to the second embodiment of the present invention.

Thus, while the above-described processes are repeated, in the electrode assembly, the separator is gathered and bonded to edges of both ends A as illustrated in FIG. 7. Since both the ends are fixed, the movement of the electrode may be prevented.

Consequently, in the electrode assembly manufactured according to this embodiment, a separator 1 disposed at an m layer (where m is a natural number) covers a top surface of an electrode disposed at an n layer (where n is a natural number greater than or equal to 1), then an electrode disposed at an n+1 layer is stacked on the separator 1, and then, a separator disposed at an m+1 layer covers a top surface of the electrode disposed at the n+1 layer. In particular, an edge of the separator disposed at the m+1 layer may be gathered and bonded to an edge of the separator disposed at the m layer.

According to the present invention having the above-described structure, the separator 1 may be bonded to the electrode, or the edges of the separators may be bonded to each other to fix the movement of the electrode, thereby improving the stability. In addition, since the separator is not stacked in the width direction, the capacity per unit volume may increase.

Furthermore, an electrode assembly in which electrode tabs (positive tabs or negative tabs) of electrodes (positive electrodes or negative electrodes) are stacked in a direction in which the electrode tabs pass through a separator, and a method for manufacturing the electrode assembly will be described according to Embodiment 3 of the present invention.

Embodiment 3

In a stack-type battery according to Embodiment 3, a plurality of electrodes are stacked like the foregoing embodiments. In an electrode assembly in which a negative electrode and a positive electrode are sequentially and alternately stacked, and a separator is disposed between the negative electrode and the positive electrode, a top surface of an electrode plate disposed at an n layer (where n is a natural number greater than or equal to 1) is covered by the separator, and the top surface of the electrode plate is fixed and bonded to the separator.

Figure 8A:
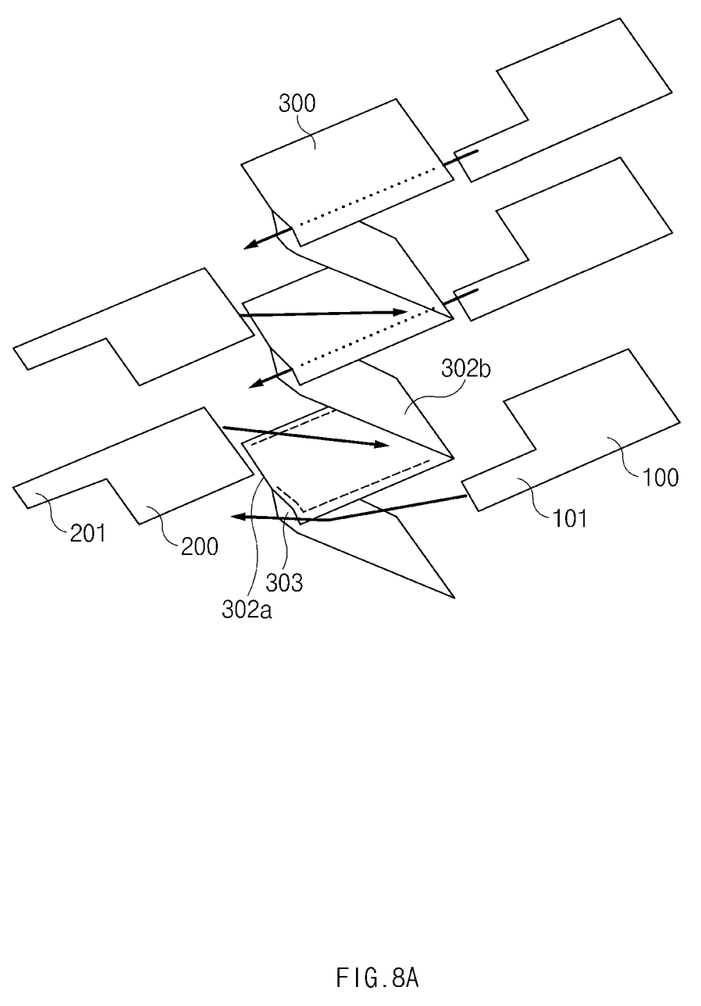
FIG. 8A is an exploded perspective view of an electrode assembly manufactured by a manufacturing method according to a third embodiment of the present invention.

As illustrated in FIG. 8A, according to Embodiment 3, the separator 300 covers the top surface of the first electrode plate 100 disposed at the n layer and is bent to one side to form a collision part 302a, and a portion of the collision part 302a is cut to form an opening 303. The opening 303 has an adequate size in a position at which a first electrode terminal 101 that is an electrode tab of the first electrode plate 100 disposed at the n layer is insertable.

Accordingly, Embodiment 3 is different from the foregoing embodiments in that the first electrode terminal 101 and a second electrode terminal 202 are disposed to face the bent point of the separator 300. However, Embodiment 3 is the same as the foregoing embodiments in that the separator is bonded to the top surface of the electrode plate.

In this embodiment according to the stack-type battery of the present invention, a plurality of battery elements are repeatedly stacked, and the battery elements comprise a first electrode plate, a first electrode terminal disposed on at least one end of the first electrode plate, and a separator that covers both surfaces of the electrode plate. As illustrated in FIG. 8A, the separator 300 is bent by the collision part 302a at the one end of the first electrode plate 100, and the opening 303 is formed in at least a portion of the collision part 302*a*.

The first electrode terminal 100 is protruded from the separator 300 through the opening 303 therebetween. Further, in the separator 300, a second collision part 302*b* bent from one end of the second electrode plate 200 and a third collision part 302*c* disposed in a direction in which the second electrode terminal 201 disposed on the other end of the second electrode plate 200 is protruded are provided to cover both surfaces of the second electrode plate 200 disposed on the first battery element.

In particular, the first electrode terminal 101 and the second electrode terminal 201 are protruded in the same direction, and the collision part 302*a* and the second collision part 302*b* correspond to the bent points of the separator 300.

On the other hand, the third collision part 302*c* may be formed on a portion at which the cut portions for forming the opening 303 are bonded to each other. In other words, the third collision part 302*c* may be a bonding part at which the separators are bonded to each other.

The stack-type battery comprises one of the features disclosed in Embodiments 1 and 2 in common. In particular, the top surface of the electrode plate disposed at the n layer (where n is a natural number greater than or equal to 1) is covered by the separator 300, and the separator 300 is fixed and bonded to the top surface of each of the electrode plates.

Alternatively, the separator 300 disposed at the m layer (where m is a natural number greater than or equal to 1) is covered on the top surface of the electrode plate disposed at the n layer (where n is a natural number greater than or equal to 1), the electrode plate disposed at the n+1 layer is stacked on the separator 300, a separator disposed at an m+1 layer covers the top surface of the electrode plate disposed at the n+1 layer, and an edge of the separator disposed at the m+1 layer, on which the electrode plate is not covered, is gathered and bonded to an edge of the separator disposed at the m layer, on which the electrode is not covered.

Furthermore, a method for manufacturing a stack-type battery according to the present invention comprises a step of accommodating a small-area electrode 200 (see the second electrode in FIG. 8B) in a bag-shaped separator 300 (in which a portion is closed, and a portion is opened); a step of bonding at least a portion of an opening 303 of the bag-shaped separator 300 except a position through which a bonding part of a plate-shaped electrode terminal, to which a collector (that is a plate-shaped member that serves as a support to allow an active material that is a powder state to exist in the form of a pole plate) is bonded, is protruded; a step of alternately stacking the small-area electrodes 200 and large-area electrodes 100; and a step of heating a terminal bonding part 201 of the small-area electrode 200 or the collector of the electrode to thermally fuse the separator 300, thereby forming a collision part 302*c* that restricts movement of a cross-section of the large-area electrode 200. The method further comprises a step of covering a top surface of a small-area electrode 200 disposed at an n layer (where n is a natural number greater than or equal to 1) with the separator 300; a step of heating the separator 300 covered on the small-area electrode 200 disposed at the n layer; a step of stacking a large-area electrode 100 disposed at an n+1 layer on the heated separator 300; a step of covering a top surface of the large-area electrode 100 disposed at the n+1 layer with the separator 300; and a step of heating the separator 300 covered on the top surface of the large-area electrode 100 disposed at the n+1 layer.

Figure 8B:
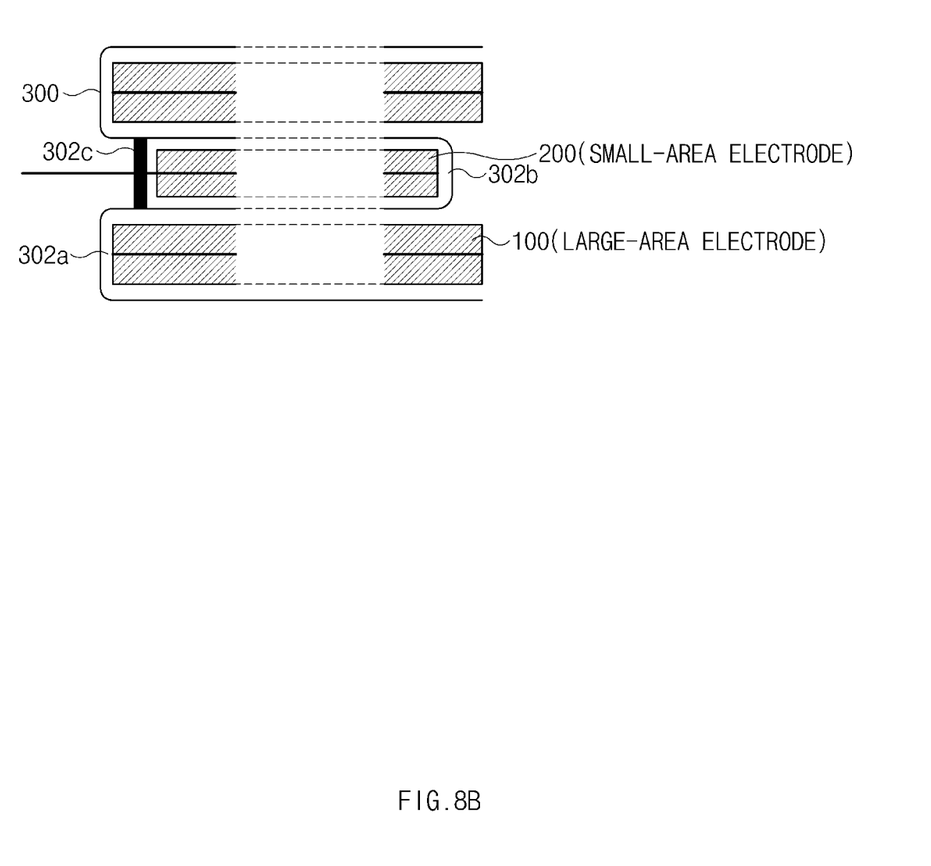
FIG. 8B is a partial enlarged side view of the electrode assembly manufactured by the manufacturing method according to the third embodiment of the present invention.

In the stack-type battery having the above-described structure, the top surface of the electrode plate disposed at each of the layers is bonded to the separator 300, and thus, movement of the electrode plate is suppressed. In addition, both ends of the electrode plate may also be constrained by the collision parts and thus be suppressed in movement.

Furthermore, in the above-described structure, when the electrode plates disposed at the layers have the same area, a vertical length (even though a torn portion is formed due to the formation of the opening) may be shortened.

To solve the above-described problem, in an embodiment of the present invention, as illustrated in FIG. 8B, each of the electrodes disposed at the n layer and an n+2 layer may be a large-area electrode having a relatively large area, and the electrode disposed at the n+1 layer may be a small-area electrode having a relatively small area. Thus, in a state in which the torn portions due to the formation of the opening contact each other, heat may be applied (applied to the small-area electrode or directly applied to the contact portion of the separators) to bond the upper and lower separators to each other, thereby forming a bonding part.

In the method for manufacturing the electrode assembly, as described above, the negative electrode plate and the positive electrode plate may be sequentially and alternately stacked, and the separator may be disposed between the negative electrode and the positive electrode. In addition, one of the negative electrode plate or the positive electrode plate may be provided as the small-area electrode, and the other of the negative electrode plate and the positive electrode plate may be provided as the large-area electrode. Then, the separator may be heated to be boned to each of the top surface of each of the electrode plate disposed at each of the layers. In addition, the heat may be applied to the end of the small-area electrode to perform the additional bonding.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, in which a plurality of electrodes are stacked, wherein a negative electrode and a positive electrode are sequentially and alternately stacked, and a separator is disposed between the negative electrode and the positive electrode, the method comprising:

covering a top surface of an electrode disposed at an n layer (where n is a natural number greater than or equal to 1) with the separator;

heating a first part of the separator that directly overlaps the electrode disposed at the n layer;

stacking an electrode, which is disposed at an n+1 layer, on the heated separator;

covering a top surface of the electrode, which is disposed at the n+1 layer, with the separator; and heating a second part of the separator that directly overlaps the electrode disposed at the n+1 layer, wherein the heating of the second part of the separator that directly overlaps the electrode disposed at the n+1 layer is performed after the heating of the first part of the separator that directly overlaps the electrode disposed at the n layer.

2. The method of claim 1, wherein the separator covers the electrode being connected from an end of one side to an end of the other side of the electrode disposed at the n layer, and while the electrode disposed at the n layer and the electrode disposed at the n+1 layer are continually stacked, the separator has a continuous shape that plies in a zigzag shape between the one side and the other side of the electrodes.

3. The method of claim 2, wherein, when the separator plies between the one side and the other side to be continuous in the zigzag shape, a gripper that supports a point, at which the separator is bent while the separator is changed in direction, is inserted.

4. The method of claim 3, wherein the gripper is slidably disposed in a direction perpendicular to the direction in which the separator plies.

5. The method of claim 4, wherein the gripper is provided in two, which are disposed one by one at positions that face each other.

6. The method of claim 1, wherein the separator is heated by a heating plate, and heat and pressure are applied to the separator to bond the separator to the top surface of the electrode that contacts the separator.

7. The method of claim 1, wherein the separator is heated by a gripper, and heat and pressure are applied to the separator to bond the separator disposed at a corresponding layer to the separator disposed below the separator disposed at the corresponding layer.

8. The method of claim 7, wherein the gripper has a size and a shape that are capable of pressing an edge of the separator, on which each electrode is not covered.

9. The method of claim 8, wherein each electrode has a rectangular shape, and the gripper has a shape having at least one orthogonal portion.

10. The method of claim 3, wherein the separator is bent at the point supported by the gripper to form a fold in the separator, wherein the point is located inside the fold in the separator, and wherein the gripper directly contacts the point located inside the fold when the separator is being bent.

11. The method of claim 1, wherein the heating of the second part, of the separator that directly overlaps the electrode disposed at the n+1 layer is performed after the both the stacking of the electrode, which is disposed at the n+1 layer, on the heated separator, and the covering of the top surface of the electrode, which is disposed at the n+1 layer, with the separator heating of the first part of the separator that directly overlaps the electrode disposed at the n layer.

12. The method of claim 1, wherein the stacking of the electrode, which is disposed at an n+1 layer, on the heated separator, fixedly bonds the electrode on the n+1 layer before the top surface of the electrode on the n+1 layer is covered with the separator.

* * * * *